July 21, 1953 — J. K. WISNER, JR — 2,645,789
BACK SEAT PLAYPEN
Filed July 8, 1950
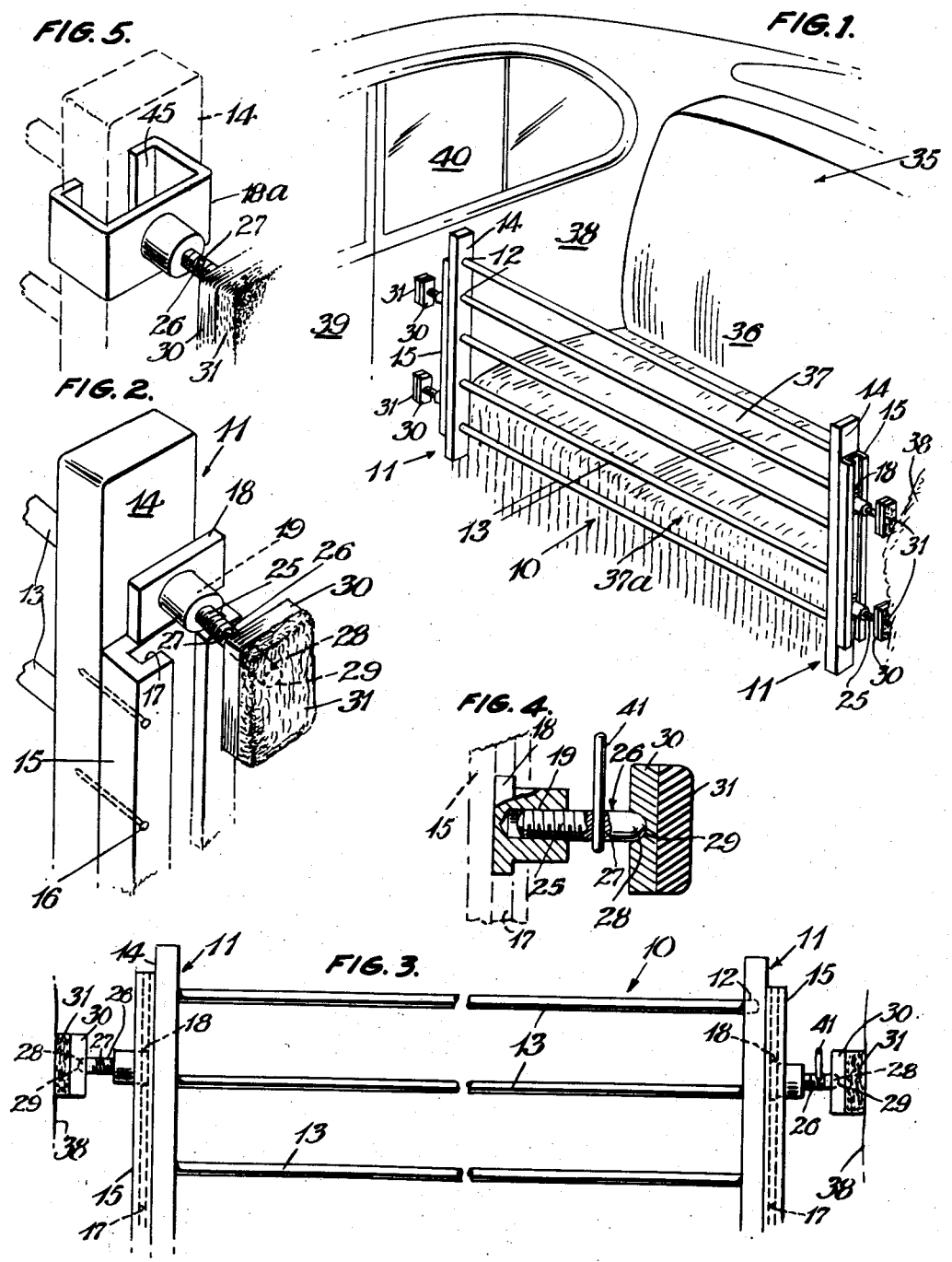
INVENTOR
JOSEPH K. WISNER, JR.
ATTORNEY Patented July 21, 1953

2,645,789

UNITED STATES PATENT OFFICE 2,645,789

BACK SEAT PLAYPEN

Joseph K. Wisner, Jr., San Francisco, Calif.

Application July 8, 1950, Serial No. 172,671

5 Claims. (Cl. 5—94)

This invention relates to a back seat play pen. More particularly, it relates to a structure adapted to be mounted on or adjacent the rear seat of a passenger automobile to provide a play pen or enclosure for a small child.

Prior structures intended for the same general purpose as the structure of the present invention, are impractical in one or more respects. For example, certain of them require bolting or screwing to parts of the automobile. This, of course, is undesirable because the necessary bushings or other fixtures are expensive to install and being part of a permanent installation, when the play pen is removed they remain as unsightly objects. Also, certain of the prior structures are unduly complicated in design and operation and/or are difficult to mount, demount and disassemble. Further, the structures of the prior art are not readily adjustable as to height and length and so are not adaptable to all types and makes of automobiles.

It is an object of the present invention to provide an improved form of play pen or child's enclosure for mounting in the rear compartment of a passenger automobile.

It is an object of the present invention to provide an improved form of play pen or child's enclosure for mounting in the rear compartment of a passenger automobile in cooperative relation to the rear seat.

It is a particular object of the present invention to provide a back seat play pen which is easily assembled and mounted and easily taken down and disassembled without the necessity of employing bushings or other fixtures which are fixed to and become permanent parts of an automobile.

It is a further particular object of the invention to provide a back seat play pen which is easily mounted in the rear compartment of a passenger automobile, and which is easily adjustable as to effective length and height.

It is a further object of the present invention to provide a safety barrier structure which may be installed and removed with a minimum of effort and trouble across windows, doors and stairways.

These and other objects of the invention will be apparent from the ensuing description and the appended claims.

One form of the invention is illustrated by way of example in the accompanying drawings and is described in detail hereinafter.

In the drawings:

Figure 1 is a perspective view showing the rear compartment of a passenger automobile with the back seat play pen or child's enclosure of the present invention mounted therein.

Figure 2 is a fragmentary perspective view of one end of the play pen structure of Figure 1.

Figure 3 is a front elevation of the play pen structure of Figure 1.

Figure 4 is a section taken through one of the slide shoes and the clamping blocks.

Figure 5 is a fragmentary perspective view of a modified form of slide shoe.

Referring now to the drawings, and more particularly to Figure 1 thereof, a play pen structure is shown and is generally designated by the numeral 10. The main structural elements of the structure 10 are a pair of upright posts 11 which are arranged in parallelism and formed with spaced, registered sockets 12 (see Figures 1 and 3), and a number of dowels or cross bars 13 which extend between posts 11 and are received in the sockets 12. When the structure is assembled and mounted as shown, the dowels 13 provide a barrier, and when the structure is taken down and the dowels are removed from the sockets 12, the entire assembly of parts can be neatly packed so as to occupy very little space.

Referring now more particularly to Figures 2 and 3, it will be seen that each of the posts 11 comprises a main body portion 14 which is preferably constructed of wood. To the outer edge or side thereof is affixed a slide member 15 which may be constructed of wood or metal as desired, and which is affixed to the main body member 14 by any suitable means, as by nails or screws 16. Each slide member 15 extends substantially the entire length of its post 11 and is formed with a T-shaped slot 17 in which a pair of longitudinally spaced, T-shaped slide shoes 18 are slidably disposed. Each of the slide shoes 18 is tapped and threaded at 19 to receive the threaded end 25 of a screw 26. The screw 26 is formed near its outer end with a hole 27 for a purpose to be explained hereinafter, and at its extreme outer end it is formed with a rounded head 28 to be received in a socket 29 formed in a clamping block or shoe 30. The clamping block or shoe 30 may be constructed of wood, metal or any other suitable material, and to its outer surface is affixed a soft pad 31 constructed, for example, of sponge rubber or any suitable resilient or soft material which will not scuff or tear the upholstery of an automobile.

In Figure 1 the play pen structure 10 is shown as being mounted in the rear compartment 35 of an automobile. The said compartment comprises the usual back rest 36, seat cushion 37 side walls 38, door 39 and side window 40. In mounting the play pen structure in the rear compartment 35, the several dowel members 13 will be inserted in the sockets 12 in post 11. If desired, the ends of the dowels 13 and the sockets 12 may be threaded so that, when the structure is assembled, the dowels will remain in place during the preliminary handling. Alternatively, a frictional fit may be provided. In any event, it is preferred that the dowels 13 be easily detachable from the sockets 12 so that, when it is desired to take down the structure, not only may it be removed from the rear compartment 35 but the several parts thereof can be completely disassembled. The disassembled parts can then be arranged so as to occupy very little space. They can be stored, for example, in the trunk compartment of the automobile, or on the floor of the rear compartment without being in the way or occupying space which could be utilized otherwise.

Assuming that the dowels 13 and the posts 11 have been properly assembled, the structure 10 is then placed in the rear compartment 35 as shown, preferably with the lower ends of the posts 11 adjacent the edge 37a of the cushion 37, as illustrated. The structure is also adjusted suitably for height, having regard to the size, age and activity of the child to be incarcerated. Next, the slide shoes 18 are spaced a suitable distance apart. The two slide shoes 18 may, if desired, be connected by a suitable connecting member (not shown). Preferably, however, they are unconnected so that their spacing may be varied, thereby making it possible to permit clearance of interfering structures such as window cranks, door handles and the like. A key or rod 41 may be provided for insertion in the key holes 27 of the screws 26. The latter will ordinarily be adjusted approximately by hand to place the clamping shoes 30 at both ends of the play pen, adjacent the side walls or the doors of the rear compartment. The key 41 will then be employed to turn the screws 26 and thereby apply any desired amount of pressure to the side walls or doors of the car, thereby firmly clamping the structure in adjusted position.

Referring now to Figure 5, a modified form of slide shoe is there illustrated. Thus, a slide shoe 18a is provided which is in the form of a channel which circumscribes three sides of the post 14 and has ears 45 which abut the fourth side of the post 14. The slide shoe 18a is in sliding contact with the post, and there will, of course, be provided two of the shoes for each of the posts 14. An important advantage of this form of slide shoe is that it is easily fabricated and it avoids the necessity of a slide member such as shown at 15 in Figure 2.

It will thus be apparent that a play pen structure has been provided which is suitable for mounting in the rear compartment of an automobile. This structure is very simple in design and construction; hence, it meets the desideratum of low manufacturing cost. Also, it is very simple to operate, being extremely simple to assemble and to mount in the rear compartment of an automobile and being equally easy to demount and to disassemble. When disassembled it is very compact and occupies so little space that it may be tucked away in the trunk compartment of an automobile.

The structure has the further advantage that it does not require the installation of permanent automobile fixtures, such as threaded bushings or the like. This greatly reduces the expense of installation, avoids the presence of unsightly fixtures, and yet the mounting means is easily operated and clamps the structure firmly and dependably in position. Also, the structure is readily adjustable in three dimensions, that is to say, it may be moved up or down relatively to the rear seat of an automobile to provide a higher or a lower play pen, as may be required. It may be adjusted longitudinally, that is to say, across the width of the rear compartment of an automobile thereby adapting it to a wide range of makes and styles of automobiles. Finally, it is adjustable rearwardly and forwardly to provide a play pen of greater or lesser width, as desired.

These same structural advantages are obtained when the device is used as a safety barrier across windows, doors and stairs.

I claim:

1. A structure adapted for mounting in the rear compartment of an automobile to provide one wall of a play pen, the other walls of which are formed by the side walls and rear wall of such rear compartment and the floor of which is formed by the seat in said rear compartment; said structure comprising spaced, parallel vertical posts, cross bars extending therebetween, and friction pad assemblies for each post, each of said friction pad assemblies comprising a shoe slidably mounted on its post for sliding vertical adjustment and a pad member adapted to bear against a side wall or door of said rear compartment, and screw means for moving said pad member longitudinally of the structure for applying pressure to said side wall or door.

2. A structure of the character described forming one wall of a play pen, the other walls of which are formed by the side walls and rear wall of the rear compartment of an automobile and the floor of which is formed by the seat in such rear compartment, said structure comprising spaced, parallel posts, a plurality of bars extending therebetween and detachable therefrom, friction pad means for each post including a shoe slidable for vertical adjustment along the post, a yielding pad member adapted to bear against a side wall or door of the rear compartment of an automobile, and screw means for moving said yielding pad member toward or away from said post and longitudinally of the structure to apply varying degrees of pressure to the side walls or doors of an automobile and to adjust the effective length of the structure to fit rear compartments of varying widths.

3. A structure of the character described comprising a vertical post receiving one end of a cross member, the other end of which is to received in a similar vertical post parallel to the first mentioned post, slide means including a slide shoe adjustable vertically along said post, a yielding pad member on the slide shoe and bearing against a side wall or door of an automobile, and means for moving said yielding pad member inwardly or outwardly with respect to said post to apply varying degrees of pressure to said side wall or door.

4. A structure of the character described adapted to be easily and firmly mounted in the rear compartment of an automobile, to be easily demounted and disassembled and forming one wall of a play pen, the other walls of which are formed by the side walls and rear wall of said compartment and the floor of which is formed by the seat in such compartment, said structure comprising a pair of vertical posts, a plurality of bars or dowel members for extending between said posts, engageable therewith and readily removable therefrom, a slide track extending vertically along each post, a pair of slide shoes slidably mounted on each said track, a soft pad member on each shoe for contact with the upholstery of an automobile, and screw means joining each soft pad member with a slide shoe and operable to move its soft pad member longitudinally of the structure to apply varying degrees of pressure to a side wall or door of the rear compartment of an automobile and to adjust the effective length of the structure to fit rear compartments of varying widths.

5. A structure of the character described forming one wall of a play pen, the other walls of which are formed by the side walls and rear wall of the rear compartment of an automobile and the floor of which is formed by the seat in such compartment, comprising a pair of vertical posts each formed on one side with registering sockets and on the other side with a slide track, a plurality of dowel members for fitting within said sockets and extending between said posts to provide a barrier across the width of the rear seat of an automobile, at least one slide shoe slidably mounted on each slide track, a yielding pad member on each slide shoe for bearing against an upholstered wall or door of an automobile, and screw means connecting each slide shoe with its yielding pad member and operable to control the degree of pressure exerted by the pad member on said side wall or door and to adjust the effective length of the structure.

JOSEPH K. WISNER, Jr.

References Cited in the file of this patent

UNITED STATES PATENTS

| Number | Name | Date |
| --- | --- | --- |
| 1,539,226 | White | May 26, 1925 |
| 1,545,104 | Keith | July 7, 1925 |
| 1,799,308 | Matthiesen | Apr. 7, 1931 |
| 2,424,768 | Nalbandian | July 29, 1947 |
| 2,507,977 | Jacobsen | May 16, 1950 |
| 2,532,007 | Biasell | Nov. 28, 1950 |
| 2,594,208 | Pilot | Apr. 22, 1952 |

FOREIGN PATENTS

| Number | Country | Date |
| --- | --- | --- |
| 26,203 | Great Britain | 1911 |